US012799380B2

(12) United States Patent
Kang et al.

(10) Patent No.: US 12,799,380 B2
(45) Date of Patent: Nov. 17, 2026

(54) REFRIGERANT COMPOSITION AND HEAT PUMP INCLUDING THE SAME

(71) Applicants: SK INNOVATION CO., LTD., Seoul (KR); SK On Co., Ltd., Seoul (KR)

(72) Inventors: Bong Ho Kang, Daejeon (KR); Hye Ri Kim, Daejeon (KR); Ji Seong Noh, Daejeon (KR); Jae Min Lee, Daejeon (KR); Sang Gu Woo, Daejeon (KR)

(73) Assignees: SK Innovation Co., Ltd., Seoul (KR); SK On Co., Ltd., Seoul (KR)

(*) Notice: Subject to any disclaimer, the term of this patent is extended or adjusted under 35 U.S.C. 154(b) by 379 days.

(21) Appl. No.: 18/671,993

(22) Filed: May 23, 2024

(65) Prior Publication Data

US 2024/0392177 A1 Nov. 28, 2024

(30) Foreign Application Priority Data

May 25, 2023 (KR) ........................ 10-2023-0067697
Mar. 29, 2024 (KR) ........................ 10-2024-0042909

(51) Int. Cl.
*F25B 30/02* (2006.01)
*C09K 5/04* (2006.01)

(52) U.S. Cl.
CPC .............. *C09K 5/044* (2013.01); *F25B 30/02* (2013.01); *C09K 2205/122* (2013.01); *C09K 2205/22* (2013.01)

(58) Field of Classification Search
None
See application file for complete search history.

(56) References Cited

U.S. PATENT DOCUMENTS

| | | | |
|---|---|---|---|
| 2006/0116310 A1 | 6/2006 | Singh et al. | |
| 2008/0121837 A1 | 5/2008 | Singh et al. | |
| 2022/0348810 A1 | 11/2022 | Itano et al. | |
| 2022/0364007 A1 | 11/2022 | Matsumoto | |

FOREIGN PATENT DOCUMENTS

| | | | | | |
|---|---|---|---|---|---|
| CN | 109852348 A | | 6/2019 | |
| CN | 110746936 A | * | 2/2020 | C09K 5/04 |
| CN | 111154456 A | | 5/2020 | |
| CN | 110699043 B | | 11/2020 | |
| CN | 113969139 A | | 1/2022 | |
| CN | 114702938 A | * | 7/2022 | C09K 5/045 |
| JP | 09059612 A | * | 3/1997 | C09K 5/04 |
| KR | 10-2021-0045402 A | | 4/2021 | |
| KR | 10-2021-0089167 A | | 7/2021 | |
| KR | 10-2363808 B1 | | 2/2022 | |
| WO | 97/15637 A1 | | 5/1997 | |

OTHER PUBLICATIONS

Translation of CN 109852348 (Year: 2019).*
Translation of WO 1997/015637 (Year: 1997).*
Translation of CN111154456 (Year: 2020).*
Translation of CN 113969139 (Year: 2022).*
KIPO, Appl. 10-2024-0042909. Office Action, Jan. 7, 2026.
Nuochen Zhang et al., Study on environmentally friendly refrigerant R13I1/R152a as an alternative for R134a in automotive air conditioning system, Chinese Journal of Chemical Engineering, 2022, pp. 292-299, vol. 44.
International Search Report for the International Application No. PCT/KR2024/006841 issued by the International Searching Authority (Korean Intellectual Property Office) on Sep. 4, 2024.
Extended European Search Report for European Patent Application No. 24177398.5 issued by the European Patent Office on Oct. 16, 2024.

* cited by examiner

*Primary Examiner* — Tanisha Diggs
(74) *Attorney, Agent, or Firm* — Jones Day

(57) ABSTRACT

A refrigerant composition according to embodiments of the present disclosure includes trifluoroiodomethane (R-13I1), 1,1-difluoroethane (R-152a) and difluoromethane (R-32), wherein a content of the trifluoroiodomethane (R-13I1) may be 20 to 60 wt. % based on a total weight of the refrigerant composition. Accordingly, environmental pollution caused by the refrigerant composition may be suppressed, and the cooling performance of the refrigerant composition may be improved.

16 Claims, 2 Drawing Sheets

[FIG. 1]
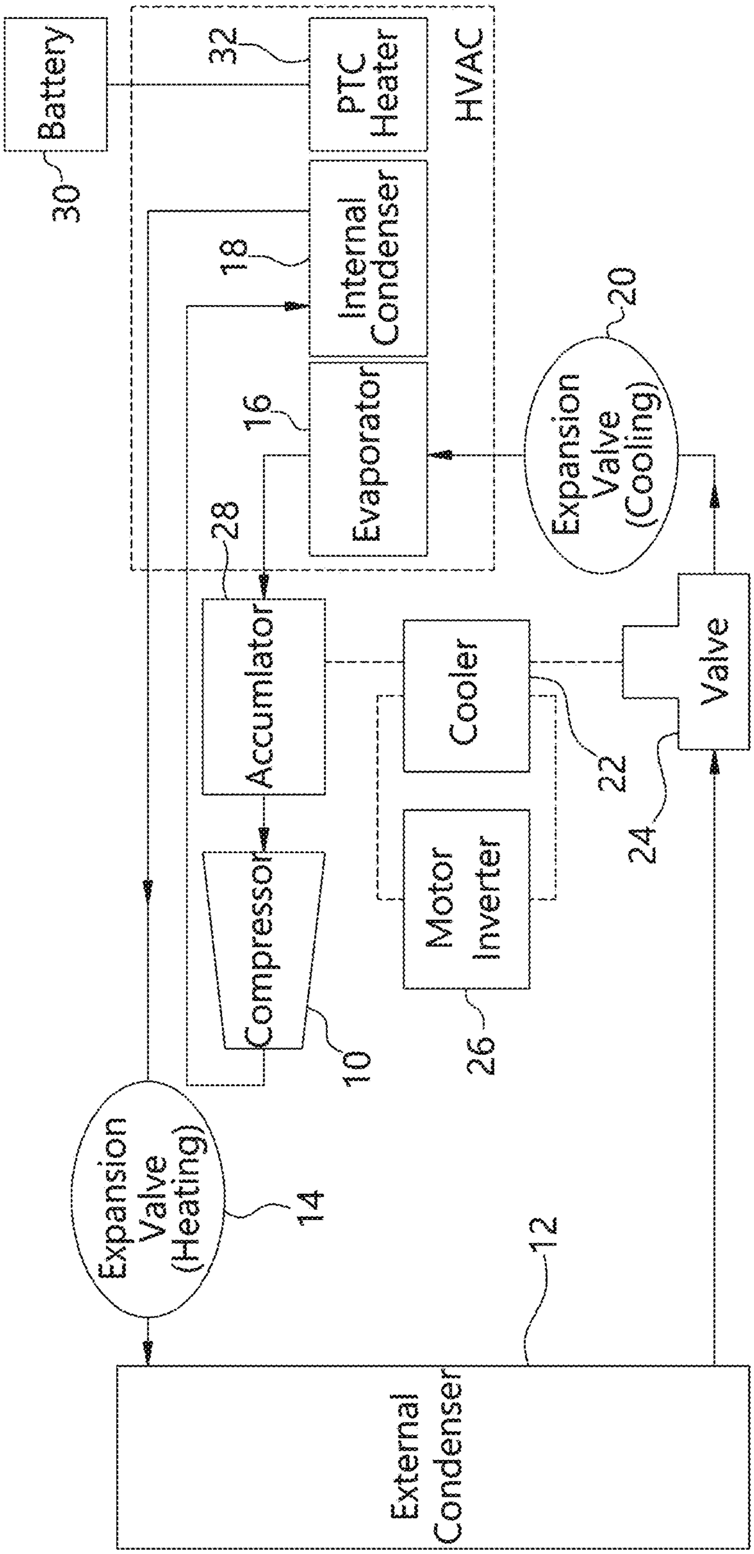

[FIG. 2]
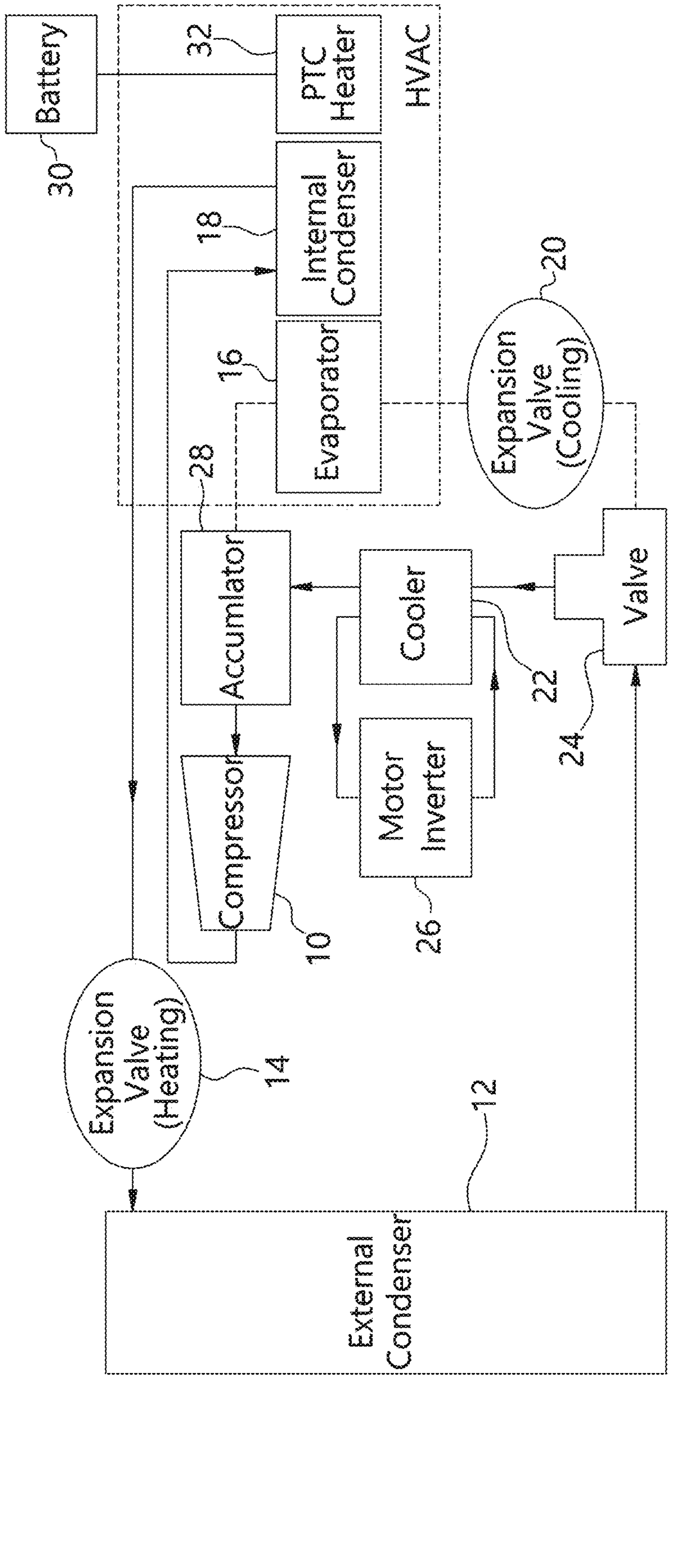

REFRIGERANT COMPOSITION AND HEAT PUMP INCLUDING THE SAME

CROSS-REFERENCE TO RELATED APPLICATION(S)

This application claims priority under 35 U.S.C. § 119 to Korean Patent Application Nos. 10-2023-0067697, filed on May 25, 2023 and 10-2024-0042909 filed on Mar. 29, 2024 in the Korean Intellectual Property Office, the disclosure of which is incorporated herein by reference in its entirety.

BACKGROUND OF THE INVENTION

1. Field of the Invention

Embodiments of the present disclosure relate to a refrigerant composition and a heat pump including the same. More specifically, the embodiments relate to a refrigerant composition containing a plurality of different refrigerants and a heat pump including the same.

2. Description of the Related Art

Refrigerants are used to remove heat from heat pumps in air conditioners, refrigerators, cooling towers and the like. The refrigerants may include, for example, natural refrigerants, chlorofluorocarbon (CFC)-based refrigerants, hydrochlorofluorocarbon (HCFC)-based refrigerants, hydrofluorocarbon (HFC)-based refrigerants, and hydrofluoroolefin (HFO)-based refrigerants.

Recently, the types of heat pumps used indoors and outdoors have become more diverse. Also due to the development of electric vehicles miniaturized heat pumps are required. Furthermore, refrigerants containing chlorine (Cl) may damage the ozone layer. Hence, the development of refrigerants which do not contain chlorine atoms are being evaluated.

For example, 2,3,3,3-tetrafluoropropene (R-1234yf) which is a type of hydrofluoroolefin-based refrigerant does not contain chlorine atoms. Therefore, this substance is actively used as a refrigerant in an air conditioner for a vehicle due to a low global warming potential (GWP).

However, when 2,3,3,3-tetrafluoropropene is used as a refrigerant in the air conditioner for a vehicle due to its low coefficient of performance (COP), there is a problem that the performance of the air conditioner is decreased and an additional heat pump is required.

Therefore, there is a need to develop a refrigerant which has a high coefficient of performance while at the same time is capable of suppressing environmental pollution and reduces global warming.

SUMMARY

An object according to embodiments is to provide a refrigerant composition with improved environmental friendliness.

Another object according to embodiments is to provide a heat pump which includes the refrigerant composition, and has improved cooling performance.

To achieve the above objects, according to an embodiment of the present disclosure, there is provided a refrigerant composition including trifluoroiodomethane (R-13I1), 1,1-difluoroethane (R-152a) and difluoromethane (R-32), wherein a content of the trifluoroiodomethane (R-13I1) is 20 to 60% by weight based on a total weight of the mixed refrigerant composition. The inventive composition may also be referred to as a mixed refrigerant composition or mixed refrigerant.

In some embodiments, a content of the 1,1-difluoroethane (R-152a) may be 30 to 75% by weight based on the total weight of the mixed refrigerant composition, and a content of the difluoromethane (R-32) may be 5 to 10% by weight based on the total weight of the mixed refrigerant composition.

In some embodiments, the content of the trifluoroiodomethane (R-13I1) may be 40 to 60% by weight based on the total weight of the mixed refrigerant composition.

In some embodiments, a sum of the content of the 1,1-difluoroethane (R-152a) and the content of the difluoromethane (R-32) may be 40 to 60% by weight based on the total weight of the mixed refrigerant composition.

In some embodiments, a ratio of the content of the trifluoroiodomethane (R-13I1) to the content of the 1,1-difluoroethane (R-152a) based on the total weight of the mixed refrigerant composition may be 0.1 to 10.

In some embodiments, a ratio of the content of the difluoromethane (R-32) to the content of the 1,1-difluoroethane (R-152a) based on the total weight of the mixed refrigerant composition may be 0.01 to 1.

In some embodiments, a ratio of the content of the trifluoroiodomethane (R-13I1) to the content of the difluoromethane (R-32) based on the total weight of the mixed refrigerant composition may be 1 to 15.

In some embodiments, a boiling point of the mixed refrigerant composition at 1 atm may be −50 to −25° C.

In some embodiments, a critical temperature of the mixed refrigerant composition may be 90 to 120° C.

In some embodiments, a critical pressure of the mixed refrigerant composition may be 35 to 60 bar.

In some embodiments, a temperature glide of the mixed refrigerant composition at a pressure of 1.5 bar may be 1 to 15° C. The temperature glide refers to the temperature range over which the refrigerant composition changes state as it evaporates or condenses. The temperature glide may affect the performance and efficiency of the refrigerant composition.

In some embodiments, a temperature glide of the mixed refrigerant composition at a pressure of 15 bar may be 1 to 10° C.

In some embodiments, a latent heat of the mixed refrigerant composition at −25° C. may be 150 to 300 kJ/kg.

In some embodiments, a global warming potential (GWP) of the mixed refrigerant composition may be 30 to 160.

According to another embodiment of the present disclosure, there is provided a heat pump including the above-described mixed refrigerant composition.

The mixed refrigerant composition according to embodiments may include trifluoroiodomethane (R-13I1), 1,1-difluoroethane (R-152a) and difluoromethane (R-32).

Accordingly, the refrigerant included in the mixed refrigerant composition may not contain chlorine (Cl) atoms, thus environmental pollution such as ozone layer destruction can be suppressed.

The mixed refrigerant composition may have a low boiling point. Accordingly, the mixed refrigerant composition may effectively decrease the ambient temperature during vaporization from liquid to gas even at a low temperature.

In addition, the mixed refrigerant composition may have a high critical temperature. Thereby, while a cooler such as an air conditioner is operated, the mixed refrigerant composition may not become a supercritical state, such that the condensation pressure of the compressor may not be reduced. Accordingly, the coefficient of performance of a heat pump including the mixed refrigerant composition may be improved.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view illustrating the flow of a mixed refrigerant for heat exchange in a cooling mode of a heat exchanger according to embodiments of the present disclosure; and FIG. 2 is a schematic view illustrating the flow of a mixed refrigerant for heat exchange in a heating mode of the heat exchanger according to embodiments of the present disclosure.

DETAILED DESCRIPTION

According to embodiments of the present disclosure, a mixed refrigerant composition which includes trifluoroiodomethane (R-13I1), 1,1-difluoroethane (R-152a) and difluoromethane (R-32), and a heat pump including the mixed refrigerant composition are provided.

Hereinafter, embodiments of the present disclosure will be described in more detail with reference to specific experimental examples. However, the experimental examples attached to this specification exemplify preferred embodiments of the present disclosure, and serve to further understand the technical idea of the present invention along with the contents of the present disclosure. The embodiments of the present disclosure should not be construed as being limited to the specific experimental examples.

According to some embodiments, the mixed refrigerant composition may be a mixture of refrigerants which do not contain chlorine atoms (Cl). Examples of refrigerants which do not contain chlorine atoms (Cl) may include natural refrigerants, hydrofluorocarbon (HFC)-based refrigerants, and hydrofluoroolefin (HFO)-based refrigerants.

The natural refrigerant is a substance that exists naturally on earth rather than as an artificial compound. For example, the natural refrigerant may include at least one of ammonia (R-717), carbon dioxide (R-744), propane (R-290), propylene (R-1270) and butane (R-600a).

The hydrofluorocarbon (HFC)-based refrigerant is a refrigerant composed of hydrogen atoms (H), fluorine atoms (F), and carbon atoms (C). The hydrofluorocarbon (HFC)-based refrigerant may include, for example, at least one of difluoromethane (R-32), trifluoroiodomethane (R-13I1), 1,1-difluoroethane (R-152a), pentafluoroethane (R-125), 1,1,1-trifluoroethane (R-143a), trifluoromethane (R-23), fluoroethane (R-161), 1,1,1,2,3,3,3-heptafluoropropane (R-227ea), 1,1,1,2,3,3-hexafluoropropane (R-236ea), 1,1,1,3,3,3-hexafluoropropane (R-236fa), 1,1,1,3,3-pentafluoropropane (R-245fa) and 1,1,1,3,3-pentafluorobutane (R-365mfc).

The hydrofluoroolefin (HFO)-based refrigerant is a refrigerant composed of hydrogen atoms (H), fluorine atoms (F) and carbon atoms (C), and has at least one double bond between the carbon atoms. The hydrofluoroolefin (HFO)-based refrigerant may include, for example, at least one of 1,1,2-trifluoroethylene (R-1123), 2,3,3,3-tetrafluoropropene (R-1234yf), 1,3,3,3-tetrafluoropropene (R-1234ze), 1,2,3,3-tetrafluoropropene (R-1234ye), 3,3,3-trifluoropropene (R-1243zf), 1,1-difluoroethylene (R-1132a) and 1,2,3,3,3-pentafluoropropene (R-1225ye).

In some embodiments, the mixed refrigerant composition may include difluoromethane (R-32), trifluoroiodomethane (R-13I1), and 1,1-difluoroethane (R-152a). The difluoromethane (R-32), the trifluoroiodomethane (R-13I1), and the 1,1-difluoroethane (R-152a) included in the mixed refrigerant composition do not contain chlorine atoms (Cl).

The trifluoroiodomethane (R-13I1) is a type of the hydrofluorocarbon (HFC)-based refrigerant, and has an ozone depleting potential (ODP) of 0 and a global warming potential (GWP) of less than 5. In addition, the trifluoroiodomethane (R-13I1) may have high thermal and chemical stabilities. Due to the trifluoroiodomethane (R-13I1) included in the mixed refrigerant composition, the environmental friendliness and stability of the mixed refrigerant composition may be improved.

The 1,1-difluoroethane (R-152a) is a type of the hydrofluorocarbon (HFC)-based refrigerant, and has an ozone depleting potential (ODP) of 0 and a global warming potential (GWP) of 150 or less. The 1,1-difluoroethane (R-152a) may have a low molecular mass and a low saturated density. Due to the 1,1-difluoroethane (R-152a) included in the mixed refrigerant composition, the environmental friendliness of the mixed refrigerant composition may be improved. In addition, a discharge pressure from a compressor may be low due to the low saturation density. Therefore, a change in the enthalpy at the same pressure may be increased. Accordingly, refrigeration capacity of the mixed refrigerant composition may be improved.

The difluoromethane (R-32) is a type of hydrofluorocarbon (HFC)-based refrigerant, and has an ozone depletion potential (ODP) of 0 and a global warming potential (GWP) of 675. The difluoromethane (R-32) may have high thermal stability. Therefore, the stability of the mixed refrigerant composition can be improved by including the difluoromethane (R-32) in the mixed refrigerant composition.

In some embodiments, the mixed refrigerant composition may not be mixed with any refrigerant other than the trifluoroiodomethane (R-13I1), 1,1-difluoroethane (R-152a) and difluoromethane (R-32). For example, the mixed refrigerant composition may consist only or essentially of trifluoroiodomethane (R-13I1), 1,1-difluoroethane (R-152a) and difluoromethane (R-32). Accordingly, it is possible to prevent the thermal and chemical stabilities of the mixed refrigerant composition from being reduced due to the refrigerant having a low thermal or chemical stability mixed therewith. In addition, it is possible to prevent the condensation temperature of the mixed refrigerant composition from being increased due to the refrigerant having a low evaporating pressure mixed therewith.

In some embodiments, a content of the trifluoroiodomethane (R-13I1) may be 20 to 60% by weight ("wt. %") based on a total weight of the mixed refrigerant composition.

If the content of the trifluoroiodomethane (R-13I1) is less than 20 wt. % based on the total weight of the mixed refrigerant composition, thermal and chemical stabilities of the mixed refrigerant composition may be reduced. If the content of the trifluoroiodomethane (R-13I1) exceeds 60 wt. %, a refrigeration capacity of the heat pump including the mixed refrigerant composition may be reduced. Within the above content range, the refrigeration capacity may be improved, while the thermal and chemical stabilities and environmental friendliness of the mixed refrigerant composition are improved.

In some embodiments, the content of the trifluoroiodomethane (R-13I1) may be 25 to 60 wt. %, 30 to 60 wt.

%, 35 to 60 wt. %, 40 to 60 wt. %, or 45 to 55 wt. % based on the total weight of the mixed refrigerant composition. Within the above content range, the stability and refrigeration capacity of the mixed refrigerant composition may be further improved.

In some embodiments, the content of the 1,1-difluoroethane (R-152a) based on the total weight of the mixed refrigerant composition may be 30 to 75 wt. %, 40 to 75 wt. %, 40 to 70 wt. %, 40 to 65 wt. %, or 40 to 60 wt. %. Within the above content range, the refrigeration capacity of the mixed refrigerant composition may be improved. Accordingly, the temperature can be controlled even with a small amount of mixed refrigerant composition, and the efficiency of the air conditioner containing the mixed refrigerant composition may be improved.

In some embodiments, the content of the difluoromethane (R-32) based on the total weight of the mixed refrigerant composition may be 1 to 20 wt. %, 5 to 20 wt. %, or 5 to 10 wt. %. Within the above content range, the thermal stability of the mixed refrigerant composition may be further improved.

In some embodiments, a sum of the content of the 1,1-difluoroethane (R-152a) and the content of the difluoromethane (R-32) based on the total weight of the mixed refrigerant composition may be 40 to 75 wt. %, 40 to 70 wt. %, 40 to 65 wt. %, 40 to 60 wt. %, or 45 to 55 wt. %. Within the above content range, the environmental friendliness of the mixed refrigerant composition may be improved by preventing the global warming potential (GWP) value from being increased, and thermal and chemical stabilities may be improved.

In some embodiments, a ratio of the content of the trifluoroiodomethane (R-13I1) to the content of the 1,1-difluoroethane (R-152a) based on the total weight of the mixed refrigerant composition may be 0.1 to 10, 0.1 to 5, or 0.2 to 5. Within the above range, the high temperature stability of the mixed refrigerant composition may be improved, while preventing the global warming potential (GWP) value of the mixed refrigerant composition from being increased.

In some embodiments, the ratio of the content of the trifluoroiodomethane (R-13I1) to the content of the 1,1-difluoroethane (R-152a) based on the total weight of the mixed refrigerant composition may be 0.25 to 3, 0.2 to 2, 0.5 to 1.3, or 0.7 to 1.3. Within the above range, the environmental friendliness of the mixed refrigerant composition may be improved, while the high temperature stability can be further improved.

In some embodiments, the ratio of the content of the difluoromethane (R-32) to the content of the 1,1-difluoroethane (R-152a) based on the total weight of the mixed refrigerant composition may be 0.01 to 1, 0.05 to 1, 0.05 to 0.5 or 0.05 to 0.35. Within the above range, the refrigeration capacity of the mixed refrigerant composition may be improved, while preventing the global warming potential (GWP) value of the mixed refrigerant composition from being increased.

In some embodiments, the ratio of the content of the difluoromethane (R-32) to the content of the 1,1-difluoroethane (R-152a) based on the total weight of the mixed refrigerant composition may be 0.05 to 0.4, 0.05 to 0.3, 0.1 to 0.3, or 0.1 to 0.2. Within the above range, the refrigeration capacity of the mixed refrigerant composition may be further improved, while environmental friendliness is improved.

In some embodiments, the ratio of the content of the trifluoroiodomethane (R-13I1) to the content of the difluoromethane (R-32) based on the total weight of the mixed refrigerant composition may be 1 to 15, 1 to 13, or 2 to 13. Within the above range, the thermal stability of the mixed refrigerant composition may be further improved, while preventing the global warming potential (GWP) value of the mixed refrigerant composition from being increased.

In some embodiments, the ratio of the content of the trifluoroiodomethane (R-13I1) to the content of the difluoromethane (R-32) based on the total weight of the mixed refrigerant composition may be 2 to 12, 2 to 11, 5 to 11, or 9 to 11. Within the above content range, the stability of the mixed refrigerant composition may be further improved, while the environmental friendliness is improved.

In some embodiments, a boiling point of the mixed refrigerant composition at 1 atm may be −50 to −25° C., −45 to −25° C., −45 to −30° C., −42 to −30° C., −40 to −30° C., or −35 to −30° C. Within the above boiling point range of the mixed refrigerant composition, a specific volume may be decreased, without an increase in the condensation pressure. Accordingly, the refrigeration capacity of the refrigerant may be improved, while decreasing the amount of mixed refrigerant composition.

In some embodiments, a critical temperature of the mixed refrigerant composition may be 90 to 120° C., 100 to 120° C., 100 to 110° C., or 105 to 110° C. The critical temperature refers to a maximum temperature at which a specific substance may exist in a liquid state. If the critical temperature of the refrigerant is low, it may be difficult to liquefy the refrigerant in the refrigeration cycle.

Within the above critical temperature range, the mixed refrigerant composition may not become a supercritical fluid state in the refrigeration cycle. Therefore, it is possible to prevent a portion of the mixed refrigerant composition from being liquefied, and thus the refrigeration capacity may be improved.

In some embodiments, a critical pressure of the mixed refrigerant composition may be 35 to 60 bar, 35 to 50 bar, 40 to 50 bar, 43 to 50 bar, or 43 to 47 bar. The critical pressure refers to a maximum pressure at which a specific substance may exist in a liquid state. If the critical pressure of the refrigerant is high, it may be difficult to liquefy the refrigerant in the refrigeration cycle.

Within the above critical pressure range, the mixed refrigerant composition may not become the supercritical fluid state in the refrigeration cycle. Therefore, it is possible to prevent a portion of the mixed refrigerant composition from being liquefied, and thus the refrigeration capacity may be improved.

In some embodiments, a temperature glide (temperature gradient) of the mixed refrigerant composition at a pressure of 1.5 bar may be 1 to 15° C., 1 to 10° C., 1 to 8° C., or 3 to 7° C.

In some embodiments, the temperature glide of the mixed refrigerant composition at a pressure of 15 bar may be 1 to 10° C., 1 to 8° C., 2 to 8° C., or 3 to 5° C.

Within the above temperature glide range, when using a heat pump with the same volume, capacity thereof may be improved. In addition, within the above temperature glide range, a heat transfer efficiency of the refrigerant may be improved.

In some embodiments, a latent heat of the mixed refrigerant composition at −25° C. may be 150 to 300 kJ/kg, 150 to 280 kJ/kg, or 170 to 280 kJ/kg.

Within the above latent heat range, the heat released or absorbed during the phase change of the mixed refrigerant composition may be sufficient. for the desired application. Accordingly, the thermal efficiency of the mixed refrigerant composition may be improved. That is, when the mixed refrigerant composition has the above latent heat, the phase change of the mixed refrigerant may be improved and the refrigerant system may operate more efficiently, leading to improved heating or cooling performance In some embodiments, the latent heat at −25° C. may be 180 to 275 kJ/kg, 200 to 250 kJ/kg, or 200 to 230 kJ/kg. Within the above latent heat range, the thermal efficiency of the refrigerant composition may be improved, while suppressing a reduction in the environmental friendliness of the mixed refrigerant composition.

In some embodiments, the global warming potential (GWP) of the mixed refrigerant composition may be 30 to 160, 30 to 140, 30 to 120, 30 to 110, or 30 to 100.

The global warming potential (GWP) is a value of how much heat traps in the atmosphere compared to carbon dioxide (CO2) (which is the reference material) over a certain period of time (for example, 100 years), when 1 kg of the chemical substance is released into the Earth's atmosphere and, more specifically, the Earth's troposphere.

Within the above global warming potential range, environmental pollution caused by use and treatment of the mixed refrigerant composition may be suppressed significantly compared to existing refrigerants. For example, hydrofluorocarbon (HFC, R-134a), which is a widely used refrigerant, has a GWP of 1,430 over a 100-year period.

In some embodiments, the ozone depleting potential (ODP) of the mixed refrigerant composition may be 0.

The ozone depleting potential (ODP) is a value obtained by calculating a degree of effect on ozone layer destruction by any chemical substance, when assuming that the effect of trichlorofluoromethane (CFC-11) on the ozone layer destruction is 1.

As the ozone depleting potential (ODP) of the mixed refrigerant of the present invention is 0, environmental pollution caused by use and treatment of the mixed refrigerant composition may be suppressed compared to existing refrigerants.

In some embodiments, the mixed refrigerant composition may have low flammability. For example, the mixed refrigerant composition may have a flammability of Class A2L or lower in the refrigerant safety group classification of The American Society of Heating, Refrigerating and Air-Conditioning Engineers (ASHRAE). Accordingly, stability during operation and leakage of the heat pump may be improved.

According to some embodiments, the heat pump may include the mixed refrigerant composition. Accordingly, the refrigeration performance of the heat pump may be enhanced, while improving the environmental friendliness and stability.

The heat pump may include a compressor, a condenser, an expansion valve and an evaporator. In the compressor, the above-described mixed refrigerant composition may be compressed to a high temperature and high pressure state, and in the expansion valve, the above-described mixed refrigerant composition may be expanded to a low temperature and low pressure state.

For example, the above-described mixed refrigerant composition may emit or absorb heat while circulating through the compressor, the condenser, the expansion valve, and the evaporator inside the heat pump. The mixed refrigerant composition may be maintained in a gaseous state at high temperature and high pressure in the compressor. The mixed refrigerant composition may be liquefied into a liquid state by releasing the heat in the condenser. The mixed refrigerant composition may be maintained in a low-temperature and low-pressure liquid state, or a mixture state of liquid and gas in the expansion valve. The mixed refrigerant composition may absorb the heat to be vaporized into a gaseous state in the evaporator.

In some embodiments, the heat pump may contain oil. For example, suitable oils may include polyester (POE), mineral oil, alkylbenzene (AB), polyalkylene glycol (PAG), polyvinyl ether (PVE) and the like.

In some embodiments, a coefficient of performance (COP) of the heat pump may be 1 to 10. The coefficient of performance (COP) refers to a ratio of an amount of heat effectively gained to an amount of work input when operating the heat pump.

A highly efficient heat pump having the coefficient of performance in the above range may be provided using the above-described refrigerant.

Hereinafter, experimental examples including specific examples and comparative examples are proposed to facilitate understanding of the embodiments of the present disclosure. However, the following examples are only given for illustrating the embodiments and those skilled in the art will understand that various alterations and modifications are possible within the scope and spirit of the present disclosure. Such alterations and modifications are duly included in the appended claims. Furthermore, the embodiments may be combined to form additional embodiments.

EXAMPLES AND COMPARATIVE EXAMPLES (1) Mixed Refrigerant Composition

Mixed refrigerant compositions having the components and contents (wt. %) shown in Tables 1 to 5 below were prepared.

The boiling point, critical temperature, critical pressure, temperature glide at 1.5 bar and 15 bar, and latent heat at −25° C. of each of the prepared mixed refrigerant compositions were measured. The measured boiling points, critical temperatures, critical pressure, temperature glides at 1.5 bar and 15 bar, and latent heats at −25° C. of the mixed refrigerant compositions are shown in Tables 1 and 2 below.

The boiling point, critical temperature, critical pressure, temperature glide, and latent heat of the mixed refrigerant composition were measured using REFPROP (Ver 10, NIST).

TABLE 1

| | Content of each component of mixed refrigerant (wt. %) | | | Boiling point | Critical temperature | Critical pressure | Temperature glide | | Latent heat at −25° C. |
|---|---|---|---|---|---|---|---|---|---|
| Item | R-13I1 | R-152a | R-32 | (° C.) | (° C.) | (bar) | at 1.5 bar (° C.) | at 15 bar (° C.) | (kJ/kg) |
| Example 1 | 55 | 40 | 5 | −34.7 | 107.3 | 45.3 | 5.5 | 4.3 | 200.7 |
| Example 2 | 50 | 45 | 5 | −33.8 | 107.5 | 45.3 | 5.0 | 3.8 | 212.3 |

TABLE 1-continued

| | Content of each component of mixed refrigerant (wt. %) | | | Boiling point | Critical temperature | Critical pressure | Temperature glide | | Latent heat at −25° C. |
|---|---|---|---|---|---|---|---|---|---|
| Item | R-13I1 | R-152a | R-32 | (° C.) | (° C.) | (bar) | at 1.5 bar (° C.) | at 15 bar (° C.) | (kJ/kg) |
| Example 3 | 45 | 50 | 5 | −33.1 | 107.8 | 45.4 | 4.6 | 3.4 | 224.0 |
| Example 4 | 40 | 55 | 5 | −32.3 | 108.2 | 45.4 | 4.3 | 3.1 | 235.7 |
| Example 5 | 35 | 60 | 5 | −31.7 | 108.6 | 45.5 | 4.0 | 2.8 | 247.6 |
| Example 6 | 30 | 65 | 5 | −31.0 | 109.2 | 45.6 | 3.7 | 2.6 | 259.5 |
| Example 7 | 25 | 70 | 5 | −30.4 | 109.4 | 45.7 | 3.5 | 2.4 | 271.4 |
| Example 8 | 20 | 75 | 5 | −29.8 | 109.9 | 45.8 | 3.2 | 2.2 | 283.4 |
| Example 9 | 60 | 30 | 10 | −41.1 | 103.7 | 48.1 | 9.4 | 8.3 | 189.0 |
| Example 10 | 55 | 35 | 10 | −39.8 | 104.1 | 47.8 | 8.6 | 7.3 | 200.7 |
| Example 11 | 50 | 40 | 10 | −38.6 | 104.5 | 47.5 | 7.9 | 6.5 | 212.4 |
| Example 12 | 45 | 45 | 10 | −37.6 | 105.0 | 47.3 | 7.4 | 5.9 | 224.2 |
| Example 13 | 40 | 50 | 10 | −36.6 | 105.5 | 47.2 | 6.9 | 5.4 | 236.1 |
| Example 14 | 35 | 55 | 10 | −35.7 | 106.1 | 47.2 | 6.5 | 4.9 | 248.0 |
| Example 15 | 30 | 60 | 10 | −34.8 | 106.7 | 47.2 | 6.1 | 4.6 | 260.0 |
| Example 16 | 25 | 65 | 10 | −34.8 | 106.7 | 47.2 | 6.1 | 4.6 | 260.0 |
| Example 17 | 20 | 70 | 10 | −34.8 | 106.7 | 47.2 | 6.1 | 4.6 | 260.0 |

TABLE 2

| | Content of each component of mixed refrigerant (wt. %) | | | | Boiling point | Critical temperature | Critical pressure | Temperature glide | | Latent heat at −25° C. |
|---|---|---|---|---|---|---|---|---|---|---|
| Item | R-13I1 | R-152a | R-32 | R-1234yf | (° C.) | (° C.) | (bar) | at 1.5 bar (° C.) | at 15 bar (° C.) | (kJ/kg) |
| Comparative Example 1 | — | — | — | 100 | −29.7 | 94.7 | 33.8 | 0 | 0 | 177.9 |
| Comparative Example 2 | 15 | 80 | 5 | — | −29.3 | 110.3 | 45.9 | 3.0 | 2.1 | 295.4 |
| Comparative Example 3 | 15 | 75 | 10 | — | −32.5 | 108.3 | 47.2 | 5.0 | 3.7 | 296.2 |
| Comparative Example 4 | 85 | 10 | 5 | | −44.8 | 111.0 | 48.1 | 16.1 | 14.6 | 133.6 |
| Comparative Example 5 | 85 | 5 | 10 | | −52.1 | 106.4 | 54.4 | 21.1 | 21.5 | 132.6 |

The specific components described in Tables 1 and 2 are as follows.

R-13I1: Trifluoroiodomethane

R-152a: 1,1-difluoroethane

R-32: Difluoromethane

R-1234yf: 2,3,3,3-tetrafluoropropene

Experimental Example 1—GWP Calculation

Based on the global warming potential (GWP) according to the Intergovernmental Panel on Climate Change (IPCC) of R-13I1, R-152a, R-32 and R-1234yf included in the mixed refrigerant composition according to the embodiments, the global warming potentials (GWPs) of the mixed refrigerant compositions were calculated by calculating an arithmetic mean according to the weight ratio of each of R-13I1, R-152a, R-32 and R-1234yf.

Specifically, the GWP was calculated with reference to IPCC AR4 and Wiebbles (1995), and the GWP values of R-13I1, R-152a and R-32 were calculated as 1, 124 and 675, respectively.

The global warning potential (GWP) according to the IPCC was based on the global warming potential (GWP) on the basis of 100 years.

The calculated global warming potentials (GWPs) are shown in Table 3 below.

TABLE 3

| | Global warming potential (GWP) |
|---|---|
| Example 1 | 83.9 |
| Example 2 | 90.1 |
| Example 3 | 96.2 |
| Example 4 | 102.4 |
| Example 5 | 108.5 |
| Example 6 | 114.7 |
| Example 7 | 120.8 |
| Example 8 | 127.0 |
| Example 9 | 105.3 |
| Example 10 | 111.5 |
| Example 11 | 117.6 |
| Example 12 | 123.8 |
| Example 13 | 129.9 |
| Example 14 | 136.1 |
| Example 15 | 142.2 |
| Example 16 | 148.4 |
| Example 17 | 154.5 |
| Comparative Example 1 | 4.0 |
| Comparative Example 2 | 133.1 |
| Comparative Example 3 | 160.7 |
| Comparative Example 4 | 47.0 |
| Comparative Example 5 | 74.6 |

Referring to Table 3, in the examples 1-17 which include all of R-13I1, R-152a and R-32 as a refrigerant and contain R-13I1 in an amount of 20 to 60 wt. % based on the total weight of the refrigerant composition, the global warming potential was 154.5 or less.

In Examples 14 to 17 in which a sum of the contents of R-152a and R-32 exceeds 60 wt. %, the global warming potential was slightly increased.

In Comparative Examples 2 and 3 which include all of R-13I1, R-152a and R-32 as the refrigerant but contain R-13I1 in an amount of less than 20 wt. %, the global warming potential was increased compared to Example 1.

Experimental Example 2—Cooling Evaluation

FIG. 1 is a schematic view illustrating the flow of the mixed refrigerant for heat exchange in a cooling mode of the heat exchanger according to embodiments of the present disclosure.

FIG. 2 is a schematic view illustrating the flow of the mixed refrigerant for heat exchange in a heating mode of the heat exchanger according to embodiments of the present disclosure.

The flow of the mixed refrigerant is shown by using directions of the arrows in FIGS. 1 and 2.

Referring to FIG. 1, in the cooling mode, the mixed refrigerant is compressed through a compressor 10, bypasses an internal condenser 18 and an expansion valve (heating) 14 in turn, releases heat in an external condenser 12, then expands in the expansion valve (cooling) 20, and reabsorbs the heat through an evaporator 16.

Referring to FIG. 2, in the heating mode, the mixed refrigerant is compressed through the compressor 10, releases heat in the internal condenser 18, expands in the expansion valve (heating) 14, absorbs heat from the external condenser 12, and then further absorbs the heat through a cooler 22. The process diagram of FIGS. 1 and 2 further shows valve 24 which can route the refrigerant to either the expansion valve (cooling) 20 during the cooling mode or through the cooler 22 during the heating mode. A motor inverter 26 is used for improved energy efficiency by allowing the speed of the cooler system's motor to be adjusted based on the cooling demand. The system also includes an accumulator 28 before the compressor 14 for ensuring that that only refrigerant vapor enters the compressor 14. The system may also include a battery 30 and a PTC heater 32. The battery 30 is used as a primary or back up power source for the various components of the system and may, for example, power the PTC heater for defrosting evaporator coils etc.

Cooling evaluation and heating evaluation were performed using the refrigerant combinations of Examples 1 to 17 and Comparative Examples 1 to 5 through the above-described heat exchanger at different outside air temperatures.

The cooling evaluation was performed by setting the outside air temperature to 45° C., and the heating evaluation was performed by setting the outside air temperature to −7° C. and −20° C., respectively. Conditions for cooling evaluation and heating evaluation according to the above-described examples and comparative examples are shown in Table 4 below.

Specifically, the outdoor temperature (° C.), refrigerant temperature at a condenser outlet, refrigerant supercooling degree at the condenser outlet, refrigerant temperature at an evaporator outlet, and refrigerant superheating degree at the evaporator outlet are shown in Table 4 below.

TABLE 4

| Item | Refrigerant combination | Operation mode | Outdoor temperature (° C.) | Refrigerant temperature at condenser outlet (° C.) | Refrigerant supercooling degree at condenser outlet (° C.) | Refrigerant temperature at evaporator outlet (° C.) | Refrigerant superheating degree at evaporator outlet (° C.) |
|---|---|---|---|---|---|---|---|
| Experimental Example 1-1 | Example 1 | Cooling | 45 | 55 | 10 | 10 | 8 |
| Experimental Example 1-2 | Example 1 | Heating | −7 | 40 | 10 | −20 | 1 |
| Experimental Example 1-3 | Example 1 | Heating | −20 | 20 | 10 | −29 | 1 |
| Experimental Example 2-1 | Example 2 | Cooling | 45 | 55 | 10 | 10 | 8 |
| Experimental Example 2-2 | Example 2 | Heating | −7 | 40 | 10 | −20 | 1 |
| Experimental Example 2-3 | Example 2 | Heating | −20 | 20 | 10 | −29 | 1 |
| Experimental Example 3-1 | Example 3 | Cooling | 45 | 55 | 10 | 10 | 8 |
| Experimental Example 3-2 | Example 3 | Heating | −7 | 40 | 10 | −20 | 1 |
| Experimental Example 3-3 | Example 3 | Heating | −20 | 20 | 10 | −29 | 1 |
| Experimental Example 4-1 | Example 4 | Cooling | 45 | 55 | 10 | 10 | 8 |
| Experimental Example 4-2 | Example 4 | Heating | −7 | 40 | 10 | −20 | 1 |
| Experimental Example 4-3 | Example 4 | Heating | −20 | 20 | 10 | −29 | 1 |
| Experimental Example 5-1 | Example 5 | Cooling | 45 | 55 | 10 | 10 | 8 |
| Experimental Example 5-2 | Example 5 | Heating | −7 | 40 | 10 | −20 | 1 |
| Experimental Example 5-3 | Example 5 | Heating | −20 | 20 | 10 | −29 | 1 |

TABLE 4-continued

| Item | Refrigerant combination | Operation mode | Outdoor temperature (° C.) | Refrigerant temperature at condenser outlet (° C.) | Refrigerant supercooling degree at condenser outlet (° C.) | Refrigerant temperature at evaporator outlet (° C.) | Refrigerant superheating degree at evaporator outlet (° C.) |
|---|---|---|---|---|---|---|---|
| Experimental Example 6-1 | Example 6 | Cooling | 45 | 55 | 10 | 10 | 8 |
| Experimental Example 6-2 | Example 6 | Heating | −7 | 40 | 10 | −20 | 1 |
| Experimental Example 6-3 | Example 6 | Heating | −20 | 20 | 10 | −29 | 1 |
| Experimental Example 7-1 | Example 7 | Cooling | 45 | 55 | 10 | 10 | 8 |
| Experimental Example 7-2 | Example 7 | Heating | −7 | 40 | 10 | −20 | 1 |
| Experimental Example 7-3 | Example 7 | Heating | −20 | 20 | 10 | −29 | 1 |
| Experimental Example 8-1 | Example 8 | Cooling | 45 | 55 | 10 | 10 | 8 |
| Experimental Example 8-2 | Example 8 | Heating | −7 | 40 | 10 | −20 | 1 |
| Experimental Example 8-3 | Example 8 | Heating | −20 | 20 | 10 | −29 | 1 |
| Experimental Example 9-1 | Example 9 | Cooling | 45 | 55 | 10 | 10 | 8 |
| Experimental Example 9-2 | Example 9 | Heating | −7 | 40 | 10 | −20 | 1 |
| Experimental Example 9-3 | Example 9 | Heating | −20 | 20 | 10 | −29 | 1 |
| Experimental Example 10-1 | Example 10 | Cooling | 45 | 55 | 10 | 10 | 8 |
| Experimental Example 10-2 | Example 10 | Heating | −7 | 40 | 10 | −20 | 1 |
| Experimental Example 10-3 | Example 10 | Heating | −20 | 20 | 10 | −29 | 1 |
| Experimental Example 11-1 | Example 11 | Cooling | 45 | 55 | 10 | 10 | 8 |
| Experimental Example 11-2 | Example 11 | Heating | −7 | 40 | 10 | −20 | 1 |
| Experimental Example 11-3 | Example 11 | Heating | −20 | 20 | 10 | −29 | 1 |
| Experimental Example 12-1 | Example 12 | Cooling | 45 | 55 | 10 | 10 | 8 |
| Experimental Example 12-2 | Example 12 | Heating | −7 | 40 | 10 | −20 | 1 |
| Experimental Example 12-3 | Example 12 | Heating | −20 | 20 | 10 | −29 | 1 |
| Experimental Example 13-1 | Example 13 | Cooling | 45 | 55 | 10 | 10 | 8 |
| Experimental Example 13-2 | Example 13 | Heating | −7 | 40 | 10 | −20 | 1 |
| Experimental Example 13-3 | Example 13 | Heating | −20 | 20 | 10 | −29 | 1 |
| Experimental Example 14-1 | Example 14 | Cooling | 45 | 55 | 10 | 10 | 8 |
| Experimental Example 14-2 | Example 14 | Heating | −7 | 40 | 10 | −20 | 1 |
| Experimental Example 14-3 | Example 14 | Heating | −20 | 20 | 10 | −29 | 1 |
| Experimental Example 15-1 | Example 15 | Cooling | 45 | 55 | 10 | 10 | 8 |
| Experimental Example 15-2 | Example 15 | Heating | −7 | 40 | 10 | −20 | 1 |
| Experimental Example 15-3 | Example 15 | Heating | −20 | 20 | 10 | −29 | 1 |
| Experimental Example 16-1 | Example 16 | Cooling | 45 | 55 | 10 | 10 | 8 |
| Experimental Example 16-2 | Example 16 | Heating | −7 | 40 | 10 | −20 | 1 |
| Experimental Example 16-3 | Example 16 | Heating | −20 | 20 | 10 | −29 | 1 |
| Experimental Example 17-1 | Example 17 | Cooling | 45 | 55 | 10 | 10 | 8 |
| Experimental Example 17-2 | Example 17 | Heating | −7 | 40 | 10 | −20 | 1 |
| Experimental Example 17-3 | Example 17 | Heating | −20 | 20 | 10 | −29 | 1 |

TABLE 4-continued

| Item | Refrigerant combination | Operation mode | Outdoor temperature (° C.) | Refrigerant temperature at condenser outlet (° C.) | Refrigerant supercooling degree at condenser outlet (° C.) | Refrigerant temperature at evaporator outlet (° C.) | Refrigerant superheating degree at evaporator outlet (° C.) |
|---|---|---|---|---|---|---|---|
| Experimental Example 18-1 | Comparative Example 1 | Cooling | 45 | 55 | 10 | 10 | 8 |
| Experimental Example 18-2 | Comparative Example 1 | Heating | −7 | 40 | 10 | −20 | 1 |
| Experimental Example 18-3 | Comparative Example 1 | Heating | −20 | 20 | 10 | −29 | 1 |
| Experimental Example 19-1 | Comparative Example 2 | Cooling | 45 | 55 | 10 | 10 | 8 |
| Experimental Example 19-2 | Comparative Example 2 | Heating | −7 | 40 | 10 | −20 | 1 |
| Experimental Example 19-3 | Comparative Example 2 | Heating | −20 | 20 | 10 | −29 | 1 |
| Experimental Example 20-1 | Comparative Example 3 | Cooling | 45 | 55 | 10 | 10 | 8 |
| Experimental Example 20-2 | Comparative Example 3 | Heating | −7 | 40 | 10 | −20 | 1 |
| Experimental Example 20-3 | Comparative Example 3 | Heating | −20 | 20 | 10 | −29 | 1 |
| Experimental Example 21-1 | Comparative Example 4 | Cooling | 45 | 55 | 10 | 10 | 8 |
| Experimental Example 21-2 | Comparative Example 4 | Heating | −7 | 40 | 10 | −20 | 1 |
| Experimental Example 21-3 | Comparative Example 4 | Heating | −20 | 20 | 10 | −29 | 1 |
| Experimental Example 22-1 | Comparative Example 5 | Cooling | 45 | 55 | 10 | 10 | 8 |
| Experimental Example 22-2 | Comparative Example 5 | Heating | −7 | 40 | 10 | −20 | 1 |
| Experimental Example 22-3 | Comparative Example 5 | Heating | −20 | 20 | 10 | −29 | 1 |

TABLE 5

Cooling evaluation (outside air temperature: 45° C.)

| Item | Refrigerant combination | Volumetric capacity (kJ/m$^3$) | Pressure at compressor outlet (kPaA) | Temperature at compressor outlet (° C.) |
|---|---|---|---|---|
| Experimental Example 1-1 | Example 1 | 2814.2 | 1649.7 | 95.2 |
| Experimental Example 2-1 | Example 2 | 2806.1 | 1624.2 | 94.5 |
| Experimental Example 3-1 | Example 3 | 2793.8 | 1601.0 | 94.0 |
| Experimental Example 4-1 | Example 4 | 2779.2 | 1579.7 | 93.7 |
| Experimental Example 5-1 | Example 5 | 2763.6 | 1559.8 | 93.4 |
| Experimental Example 6-1 | Example 6 | 2747.8 | 1541.3 | 93.2 |
| Experimental Example 7-1 | Example 7 | 2732.1 | 1523.7 | 92.9 |
| Experimental Example 8-1 | Example 8 | 2717.3 | 1507.0 | 92.7 |
| Experimental Example 9-1 | Example 9 | 3016.2 | 1969.9 | 103.0 |
| Experimental Example 10-1 | Example 10 | 3003.7 | 1912.6 | 101.5 |
| Experimental Example 11-1 | Example 11 | 2983.6 | 1862.8 | 100.4 |
| Experimental Example 12-1 | Example 12 | 2959.2 | 1818.9 | 99.5 |
| Experimental Example 13-1 | Example 13 | 2933.6 | 1779.6 | 98.8 |
| Experimental Example 14-1 | Example 14 | 2907.4 | 1744.1 | 98.2 |
| Experimental Example 15-1 | Example 15 | 2882.3 | 1711.8 | 97.7 |

TABLE 5-continued

Cooling evaluation (outside air temperature: 45° C.)

| Item | Refrigerant combination | Volumetric capacity (kJ/m$^3$) | Pressure at compressor outlet (kPaA) | Temperature at compressor outlet (° C.) |
|---|---|---|---|---|
| Experimental Example 16-1 | Example 16 | 2858.5 | 1682.0 | 97.2 |
| Experimental Example 17-1 | Example 17 | 2835.9 | 1654.5 | 96.8 |
| Experimental Example 18-1 | Comparative Example 1 | 2545.6 | 1464.7 | 66.9 |
| Experimental Example 19-1 | Comparative Example 2 | 2703.1 | 1491.1 | 92.6 |
| Experimental Example 20-1 | Comparative Example 3 | 2815.1 | 1628.9 | 96.4 |
| Experimental Example 21-1 | Comparative Example 4 | 2570.0 | 1926.9 | 110.1 |
| Experimental Example 22-1 | Comparative Example 5 | 2744.5 | 2499.3 | 124.6 |

TABLE 6

Heating evaluation (outside air temperature: −7° C.)

| Item | Refrigerant combination | Volumetric capacity (kJ/m$^3$) | Pressure at compressor outlet (kPaA) | Temperature at compressor outlet (° C.) |
|---|---|---|---|---|
| Experimental Example 1-2 | Example 1 | 1493.0 | 1160.0 | 92.6 |
| Experimental Example 2-2 | Example 2 | 1476.3 | 1138.8 | 92.1 |

TABLE 6-continued

| Heating evaluation (outside air temperature: −7° C.) | | | | |
|---|---|---|---|---|
| Item | Refrigerant combination | Volumetric capacity (kJ/m$^3$) | Pressure at compressor outlet (kPaA) | Temperature at compressor outlet (° C.) |
| Experimental Example 3-2 | Example 3 | 1459.2 | 1119.7 | 91.8 |
| Experimental Example 4-2 | Example 4 | 1442.1 | 1102.3 | 91.5 |
| Experimental Example 5-2 | Example 5 | 1425.8 | 1086.2 | 91.3 |
| Experimental Example 6-2 | Example 6 | 1410.4 | 1071.2 | 91.2 |
| Experimental Example 7-2 | Example 7 | 1395.9 | 1057.0 | 91.0 |
| Experimental Example 8-2 | Example 8 | 1382.6 | 1043.6 | 90.9 |
| Experimental Example 9-2 | Example 9 | 1661.9 | 1404.0 | 101.7 |
| Experimental Example 10-2 | Example 10 | 1635.6 | 1358.1 | 100.3 |
| Experimental Example 11-2 | Example 11 | 1607.8 | 1318.4 | 99.3 |
| Experimental Example 12-2 | Example 12 | 1580.0 | 1283.5 | 98.5 |
| Experimental Example 13-2 | Example 13 | 1553.5 | 1252.4 | 97.9 |
| Experimental Example 14-2 | Example 14 | 1528.7 | 1224.4 | 97.3 |
| Experimental Example 15-2 | Example 15 | 1506.1 | 1198.9 | 96.9 |
| Experimental Example 16-2 | Example 16 | 1485.0 | 1175.5 | 96.4 |
| Experimental Example 17-2 | Example 17 | 1465.8 | 1153.9 | 96.0 |
| Experimental Example 18-2 | Comparative Example 1 | 1309.2 | 1018.4 | 50.8 |
| Experimental Example 19-2 | Comparative Example 2 | 1369.9 | 1030.8 | 90.7 |
| Experimental Example 20-2 | Comparative Example 3 | 1448.1 | 1133.7 | 95.6 |
| Experimental Example 21-2 | Comparative Example 4 | 1466.1 | 1402.1 | 107.9 |
| Experimental Example 22-2 | Comparative Example 5 | 1644.7 | 1839.0 | 125.0 |

TABLE 7

| Heating evaluation (outside air temperature: −20° C.) | | | | |
|---|---|---|---|---|
| Item | Refrigerant combination | Volumetric capacity (kJ/m$^3$) | Pressure at compressor outlet (kPaA) | Temperature at compressor outlet (° C.) |
| Experimental Example 1-3 | Example 1 | 1102.3 | 685.2 | 73.0 |
| Experimental Example 2-3 | Example 2 | 1087.0 | 669.8 | 72.5 |
| Experimental Example 3-3 | Example 3 | 1071.8 | 656.1 | 72.1 |
| Experimental Example 4-3 | Example 4 | 1057.1 | 643.7 | 71.9 |
| Experimental Example 5-3 | Example 5 | 1043.3 | 632.3 | 71.7 |
| Experimental Example 6-3 | Example 6 | 1030.4 | 621.7 | 71.5 |
| Experimental Example 7-3 | Example 7 | 1018.3 | 611.7 | 71.3 |
| Experimental Example 8-3 | Example 8 | 1007.2 | 602.3 | 71.2 |
| Experimental Example 9-3 | Example 9 | 1233.9 | 845.8 | 82.3 |
| Experimental Example 10-3 | Example 10 | 1210.8 | 813.8 | 80.9 |
| Experimental Example 11-3 | Example 11 | 1186.7 | 786.3 | 79.9 |
| Experimental Example 12-3 | Example 12 | 1163.1 | 762.2 | 79.1 |
| Experimental Example 13-3 | Example 13 | 1141.1 | 740.8 | 78.5 |
| Experimental Example 14-3 | Example 14 | 1120.6 | 721.6 | 77.9 |
| Experimental Example 15-3 | Example 15 | 1102.1 | 704.1 | 77.4 |
| Experimental Example 16-3 | Example 16 | 1085.0 | 688.0 | 77.0 |
| Experimental Example 17-3 | Example 17 | 1069.4 | 673.2 | 76.5 |
| Experimental Example 18-3 | Comparative Example 1 | 1014.9 | 591.7 | 32.9 |
| Experimental Example 19-3 | Comparative Example 2 | 996.7 | 593.3 | 70.9 |
| Experimental Example 20-3 | Comparative Example 3 | 1055.1 | 659.3 | 76.1 |
| Experimental Example 21-3 | Comparative Example 4 | 1096.2 | 870.2 | 89.4 |
| Experimental Example 22-3 | Comparative Example 5 | 1229.5 | 1157.2 | 106.4 |

Referring to Table 5, in the examples which include all of R-13I1, R-152a and R-32 as the refrigerant and contain R-13I1 in an amount of 20 to 60 wt. % based on the total weight of the refrigerant composition, a volumetric capacity in the cooling evaluation (outside air temperature of 45° C.) was 2717.3 kJ/m$^3$ or more, and a temperature at the compressor outlet was 103.0° C. or lower.

The volumetric capacity is an amount of energy that the refrigerant can include per unit volume. The larger the volumetric capacity, the larger the amount of energy that the same volume of refrigerant can move, thus it is a refrigerant with good air conditioning performance.

In Examples 9 to 13 which contain R-152a and R-32 in an amount of 40 to 60 wt. % based on the total weight of the refrigerant composition, the volumetric capacity was increased compared to Example 1.

In Comparative Example 1 which uses R-1234yf alone as the refrigerant, the volumetric capacity was decreased compared to Example 1.

In Comparative Examples 2 and 3 which include all of R-13I1, R-152a and R-32 as the refrigerant but contain R-13I1 in an amount of less than 20 wt. % based on the total weight of the refrigerant composition, the volumetric capacity was decreased compared to Example 1.

In Comparative Examples 4 and 5 which include all of R-13I1, R-152a and R-32 as the refrigerant but contain R-13I1 in an amount of more than 60 wt. % based on the total weight of the refrigerant composition, the volumetric capacity was decreased compared to Example 1, and the temperature at the compressor outlet was increased.

Referring to Table 6, in the examples which include all of R-13I1, R-152a and R-32 as the refrigerant and contain R-13I1 in an amount of 20 to 60 wt. % based on the total weight of the refrigerant composition, the volumetric capacity in the heating evaluation (outside air temperature of −7° C.) was 1382.6 id/m$^3$ or more, and the temperature at the compressor outlet was 101.7° C. or lower.

In Examples 9 to 13 which contain R-152a and R-32 in an amount of 40 to 60 wt. % based on the total weight of the refrigerant composition, the volumetric capacity was increased compared to Example 1.

In Comparative Example 1 which uses R-1234yf alone as the refrigerant, the volumetric capacity was decreased and the temperature at the compressor outlet was increased compared to Example 1.

In Comparative Examples 2 and 3 which include all of R-13I1, R-152a and R-32 as the refrigerant but contain R-13I1 in an amount of less than 20 wt. % based on the total weight of the refrigerant composition, the volumetric capacity was decreased compared to Example 1.

In Comparative Examples 4 and 5 which include all of R-13I1, R-152a and R-32 as the refrigerant but contain R-13I1 in an amount of more than 60 wt. % based on the total weight of the refrigerant composition, the temperature at the compressor outlet was increased compared to Example 1.

Referring to Table 7, in the examples which include all of R-13I1, R-152a and R-32 as a refrigerant and contain R-13I1 in an amount of 20 to 60 wt. % based on the total weight of the refrigerant composition, the volumetric capacity in the heating evaluation (outside air temperature of −20° C.) was 1007.2 kJ/$m^3$ or more, and the temperature at the compressor outlet was 71.2° C. or lower.

In Examples 9 to 13 which contain R-152a and R-32 in an amount of 40 to 60 wt. % based on the total weight of the refrigerant composition, the volumetric capacity was increased compared to Example 1.

In Comparative Example 1 which uses R-1234yf alone as the refrigerant, the volumetric capacity was decreased compared to Example 1.

In Comparative Examples 2 and 3 which include all of R-13I1, R-152a and R-32 as the refrigerant but contain R-13I1 in an amount of less than 20 wt. % based on the total weight of the refrigerant composition, the volumetric capacity was decreased compared to Example 1.

When the pressure and temperature at the compressor outlet are increased, due to exceeding the heat resistance temperature and pressure resistance of components applied to an air conditioning system (e.g., a heat exchanger) during operation, durability of the air conditioning system may be reduced.

In Comparative Examples 4 and 5 which include all of R-13I1, R-152a and R-32 as the refrigerant but contain R-13I1 in an amount of more than 60 wt. % based on the total weight of the refrigerant composition, the pressure and temperature at the compressor outlet were increased.

What is claimed is:

1. A refrigerant composition comprising trifluoroiodomethane (R-13I1), 1,1-difluoroethane (R-152a) and difluoromethane (R-32), wherein a content of the trifluoroiodomethane (R-13I1) is 30 to 60% by weight based on a total weight of the refrigerant composition, and wherein a ratio of the content of the difluoromethane (R-32) to the content of the 1,1-difluoroethane (R-152a) based on the total weight of the refrigerant composition is 0.05 to 0.4;

wherein a content of the 1,1-difluoroethane (R-152a) is 30 to 60% by weight based on the total weight of the refrigerant composition, and wherein a content of the difluoromethane (R-32) is 5 to 10% by weight based on the total weight of the refrigerant composition.

2. The refrigerant composition according to claim 1, wherein the content of the trifluoroiodomethane (R-13I1) is 40 to 60% by weight based on the total weight of the refrigerant composition.

3. The refrigerant composition according to claim 1, wherein a sum of the content of the 1,1-difluoroethane (R-152a) and the content of the difluoromethane (R-32) is 40 to 60% by weight based on the total weight of the refrigerant composition.

4. The refrigerant composition according to claim 1, wherein a ratio of the content of the trifluoroiodomethane (R-13I1) to the content of the 1,1-difluoroethane (R-152a) based on the total weight of the refrigerant composition is 0.1 to 10.

5. The refrigerant composition according to claim 1, wherein a ratio of the content of the difluoromethane (R-32) to the content of the 1,1-difluoroethane (R-152a) based on the total weight of the refrigerant composition is 0.1 to 0.2.

6. The refrigerant composition according to claim 1, wherein a ratio of the content of the trifluoroiodomethane (R-13I1) to the content of the difluoromethane (R-32) based on the total weight of the refrigerant composition is 1 to 15.

7. The refrigerant composition according to claim 1, wherein a boiling point of the refrigerant composition at 1 atm is −50 to −25° C.

8. The refrigerant composition according to claim 1, wherein a critical temperature of the refrigerant composition is 90 to 120° C.

9. The refrigerant composition according to claim 1, wherein a critical pressure of the refrigerant composition is 35 to 60 bar.

10. The refrigerant composition according to claim 1, wherein a temperature glide of the refrigerant composition at a pressure of 1.5 bar is 1 to 15° C.

11. The refrigerant composition according to claim 1, wherein a temperature glide of the refrigerant composition at a pressure of 15 bar is 1 to 10° C.

12. The refrigerant composition according to claim 1, wherein a latent heat of the refrigerant composition at −25° C. is 150 to 300 kJ/kg.

13. The refrigerant composition according to claim 1, wherein a global warming potential (GWP) of the refrigerant composition is 30 to 160.

14. A heat pump comprising the refrigerant composition according to claim 1.

15. The heat pump of claim 14, wherein the content of the trifluoroiodomethane (R-13I1) is 40 to 60% by weight based on the total weight of the refrigerant composition.

16. The heat pump of claim 14, wherein a sum of the content of the 1,1-difluoroethane (R-152a) and the content of the difluoromethane (R-32) is 40 to 60% by weight based on the total weight of the refrigerant composition.

* * * * *